United States Patent [19]

Day

[11] 4,191,438
[45] Mar. 4, 1980

[54] RELEASABLE COUPLING FOR DISPLAY UNIT EXTENSION BAR

[76] Inventor: Robert H. Day, 2045 Morgan, #B, Burbank, Calif. 91504

[21] Appl. No.: 916,605

[22] Filed: Jun. 19, 1978

[51] Int. Cl.² .................. A47B 57/00; F16M 11/00
[52] U.S. Cl. .................................. 312/306; 248/412; 403/105; 312/205
[58] Field of Search ............... 312/306, 205; 248/410, 248/411, 412; 403/105, 104, 109

[56] References Cited

U.S. PATENT DOCUMENTS

| 389,005 | 9/1888 | Peck | 248/412 |
|---|---|---|---|
| 390,381 | 10/1888 | Luetke | 248/411 |
| 439,411 | 10/1890 | Luetke | 248/412 |
| 1,418,329 | 6/1922 | Schade | 403/104 |
| 1,447,519 | 3/1923 | Schade | 403/105 |
| 1,795,747 | 3/1931 | Viken | 248/411 |
| 2,042,443 | 5/1936 | Buckstone | 248/411 |
| 2,747,824 | 5/1956 | Darnell, Jr. | 248/412 |
| 2,806,723 | 9/1957 | Fairclough | 403/104 |
| 4,113,222 | 9/1978 | Frinzel | 248/412 |

FOREIGN PATENT DOCUMENTS 1461806  12/1966  France ..................... 403/105

Primary Examiner—Victor N. Sakran
Attorney, Agent, or Firm—Flam & Flam

[57] ABSTRACT

A visual display rack includes an extension bar vertically slidable in a hollow standard. A one way clutch mechanism allows the bar to be raised but unless released, locks the bar against downward movement in order to support the load placed upon the bar. The clutch mechanism is released by a button inconspicuously located at the top of the bar. The entire clutch mechanism is carried by the extension bar. The standard is not in any manner altered for cooperation with the mechanism.

6 Claims, 5 Drawing Figures

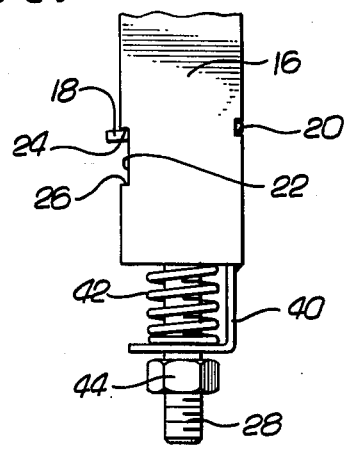
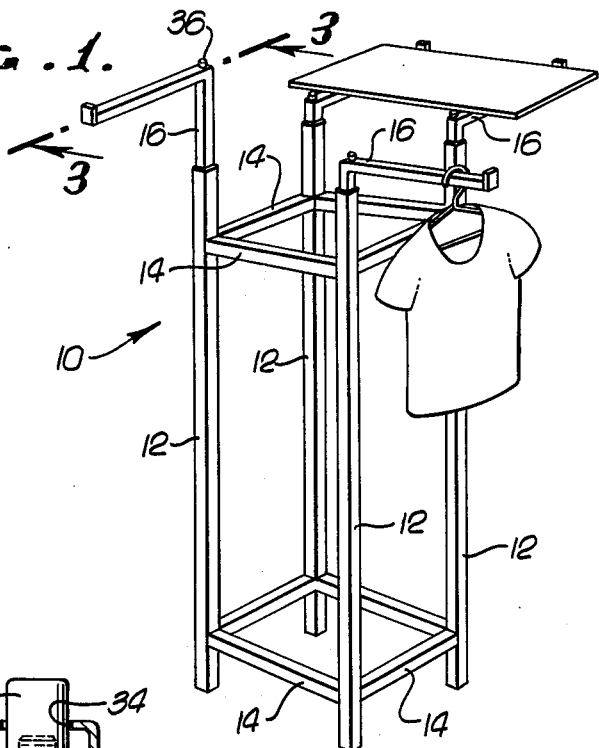
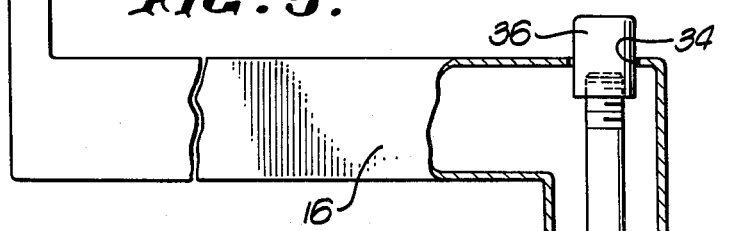
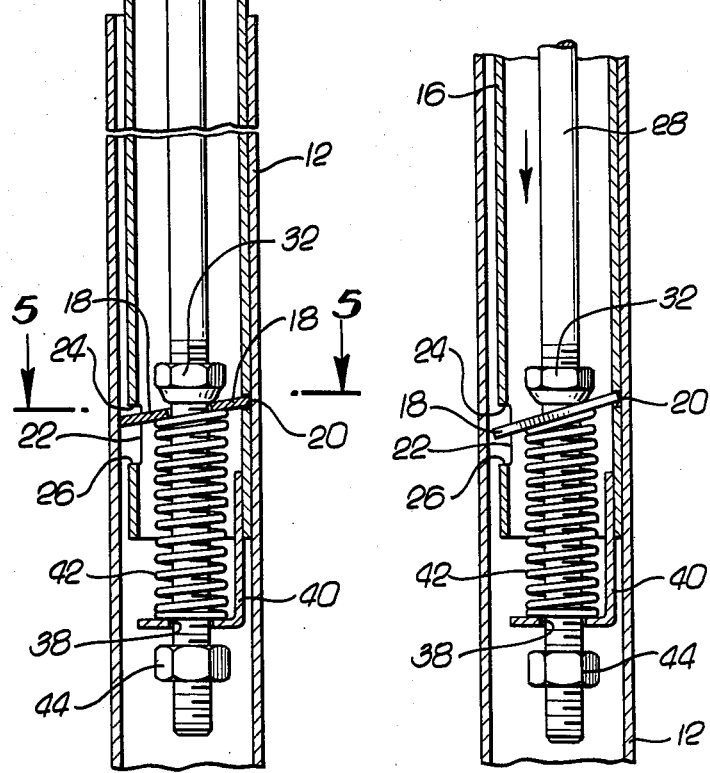
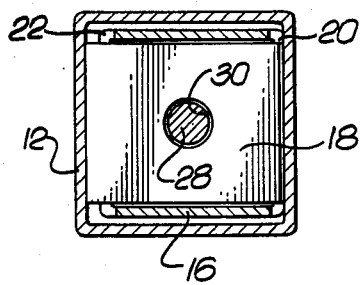

RELEASABLE COUPLING FOR DISPLAY UNIT EXTENSION BAR

BACKGROUND OF THE INVENTION

1. Field of Invention

This invention relates to display units such as used by retail establishments for merchandising various wares. More particularly, this invention relates to a vertically extensible bar and a clutch mechanism for holding it in adjusted position.

2. Description of the Prior Art

A vertically extensible bar of a display rack may have an arm for supporting a series of hangers for clothes or other merchandise. Optionally, it may cooperate with a companion bar for supporting a shelf. The typical prior art structure for holding the bar in an extended position is a series of holes in the standard and a spring detent in the bar. There are several drawbacks to this arrangement. One disadvantage is that the series of holes in the standard are unsightly. Merchandisers appreciate more elegance in the display units for their merchandise.

Other disadvantages include the inability to achieve infinite adjusted positions, the possibility of the coupling inadvertently slipping, the necessity of performing fabrication steps both on the standard and the bar.

OBJECTS OF THE INVENTION

The primary object of the present invention is to provide an improved releasable coupling for a display unit extension bar that requires no unsightly holes in the standard and in fact no fabrication at all on that part. Another object of this invention is to provide such a coupling for a display unit extension bar that wedges under load so that there is no danger of slippage once the coupling is set, but which coupling is easily released. A further object of this invention is to provide a coupling of this character that broadly distributes the pressure on the standard so evidence of stress does not appear on the highly finished display unit standard.

SUMMARY OF INVENTION

In order to accomplish the foregoing objects, I provide a toggle bar pivoted at the lower end of the extension bar, the distal end of which projects laterally to engage one side wall of the standard almost at right angles, but at a slight downward angle. As the extension bar tends to move downwardly with the end of the toggle bar in frictional engagement, the toggle bar tends to move towards a right angle relationship and throws the extension bar into engagement with the opposite side wall of the standard. The extension bar thus wedges in place. In order to release the toggle bar, a long operating rod is provided that extends downwardly from the very top of the extension bar, and engageable with the toggle bar to pivot it downwardly to free the extension bar. While the rod is held depressed and the toggle bar is held free, a new adjusted position of the extension bar is achieved. A spring retracts the operating rod and resets the toggle bar.

PRIOR ART STATEMENT

Buckstone, U.S. Pat. No. 2,042,443 discloses a telescoping standard having a clutch actuator extending to the upper end of the standard. Peck, U.S. Pat. No. 389,005 discloses a wedge action clutch for a telescoping standard which is actuated by means of a rod extending axially within the extension bar.

BRIEF DESCRIPTION OF THE DRAWINGS

A detailed description of the invention will be made with reference to the accompanying drawings wherein like numerals designate corresponding parts in the several figures. These drawings are all true to scale.

FIG. 1 is a pictorial view of a typical display unit having a series of vertically adjustable extension bars.

FIG. 2 is an enlarged elevational view of the lower end of the extension bar and showing the coupling mechanism.

FIG. 3 is a fragmentary vertical sectional view of the assembled extension bar and standard, and showing the parts held in an adjusted position.

FIG. 4 is a fragmentary sectional view similar to FIG. 3 but showing the parts released.

FIG. 5 is a transverse sectional view taken along a plane corresponding to line 5—5 of FIG. 3.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

In FIG. 1, there is shown a display unit 10 having, in this instance, four vertical standards 12 connected together by cross arms 14. The standards and cross arms may be made of various materials. However, the present invention has special utility with standards made of relatively thin walled steel tubing that has a specular finish, as by chrome plating.

Each of the standards 12 is open at the top in order telescopically to receive an extension bar 16. Each extension bar has an arm at the top that may be used to support hangers for merchandise. Each extension bar is also made as thin walled steel tubing that slidably fits the corresponding standard with slight clearance, say 1/32".

As shown in FIG. 2, the extension bar 16 carries near its lower end, a toggle bar 18. The toggle bar 18 is in the form of a small steel plate that extends across the extension bar 16. One end is seated in a narrow slot 20 cut straight across one side wall of the extension bar 16. The other end of the toggle bar 18 projects beyond a wide slot 22 cut in the opposite side wall of the extension bar. The narrow slot 20 serves as a fulcrum about which the toggle bar 18 pivots. Top and bottom end edges 24 and 26 of the wide slot 22 limit the angular movement. The upper edge 24 is located slightly downwardly of the pivot slot 22 so that the pivot bar is positively prevented from reaching a right angle relationship across the extension bar 16. This ensures foolproof assembly with the standard in a manner to be explained hereinafter.

A long operating rod 28 extends the entire length of the extension bar. One of its functions is to keep the toggle bar seated in the fulcrum slot 20. For this purpose, the operating rod 28 extends through a central hole 30 (FIG. 5) in the toggle bar 18.

The toggle bar 18 projects beyond the slot 22 by an amount slightly greater than the clearance between the extension bar 16 and the standard 12. The bar 16 accordingly must be angled downwardly (FIG. 4) to avoid interference and thus to allow sliding movement. The operating rod 28 performs this function. For that purpose, the rod 28 carries an abutment 32 in the form of a nut positioned to engage the center of the toggle bar 18 from above. By depressing the rod, the abutment 32 angularly moves the toggle bar to clear the companion side wall of the standard 12.

The rod 28 is confined for limited straight line movement. For this purpose, a guide aperture 34 is provided at the top wall of the extension bar 16. The guide aperture 34 cooperates with a push button 36 attached to the top end of the rod 28. The lower end of the rod 28 extends through a guide aperture 38 in an angle bracket 40 attached to the lower end of the extension bar. The push button 36 is conveniently engaged by the thumb while the top of the extension bar is encircled by the hand.

When the button is released, the toggle bar pivots back to take up the clearance. For this purpose, a return spring 42 is provided that encircles the rod 28 and is located between the bracket 40 and the toggle bar 18. The toggle bar 18 engages the companion wall of the standard 12 (FIG. 3) and cranks the bar 16 against the opposite wall with the projecting end of the toggle bar not quite in transverse alignment with the fulcrum provided by the pivot slot 20. Accordingly, a load on the extension bar 16 tends to move the toggle bar into such transverse alignment and a tight wedging relationship results. The wedging relationship is easily disrupted by depressing the rod 28 whereupon a new adjusted position may easily be obtained or the entire extension bar removed. The extension bar can be reinserted in any one of four orientations since the standard itself need provide only a smooth interior wall for cooperation with the toggle bar 18.

When the toggle bar is removed, return angular movement of the toggle bar 18 is determined by engagement of the toggle bar with the upper end edge 24 of the slot 22. In this position, the bar 16 cannot be reinserted without depressing the button 36. This is ensured by virtue of the fact that the upper edge 24 is downwardly offset from the fulcrum slot 20. Otherwise, the toggle bar could be cammed into the upper end of the standard and the mechanism would not function as intended.

A nut 44 at the bottom of the rod 28 prevents the rod from being lifted out of the extension bar. The nut is located so as not to stop any movement of the toggle bar 18. Thus, as shown in FIGS. 3 and 4, the nut 44 always has clearance beneath the bracket 40.

The releasable locking mechanism requires no slots, latches or any parts whatsoever to be provided on the outside standard. The mechanism acts over a sufficient area to prevent extreme localized pressure that might distort the mirror finish of the standard. Infinite adjustments are possible. The mechanism is manifestly simple and foolproof in operation.

Intending to claim all novel, useful and unobvious features shown or described, I make the following claims:

1. In a display unit or the like:
   (a) a construction of square tubular parts, one of said parts being a vertical standard open at its upper end;
   (b) an extension bar slidably fitted to said vertical standard;
   (c) a toggle bar mounted at the lower end of said extension bar for movement about a transverse pivot axis and having a distal end projecting laterally of the extension bar to engage the corresponding side of the standard;
   (d) the toggle bar being dimensioned relative to the clearance between the standard and the extension bar to engage the side of the standard at a place located beneath the level of the pivot axis whereby a load on the extension bar causes the toggle bar to wedge the extension bar against the opposite side wall of the standard;
   (e) means biasing the toggle bar to pivot upwardly in a direction corresponding to engagement with the standard; and
   (f) an operating rod extending downwardly from the top of the extension bar and movable to pivot the toggle bar downwardly against the force of said biasing means to release said extension bar from wedging relationship whereby a new position of the extension bar may be selected.

2. The combination as set forth in claim 1 together with means limiting upward pivotal movement of said toggle bar to prevent toggle reversal and to ensure foolproof insertion of the extension bar.

3. The combination as set forth in claim 1 in which said toggle bar is in the form of a plate, said extension bar having a narrow slot on one wall receiving an end of the plate for pivotal mounting of said toggle bar, said extension bar having a wide slot on the opposite wall through which the distal end of said plate projects, the top edge of said wide slot limiting upward pivotal movement of said plate at which said distal end is lower than the axis of pivotal mounting whereby reversal of the toggle bar is precluded and foolproof insertion of the extension bar is ensured.

4. In a display unit or the like:
   (a) a construction of square tubular parts, one of the parts being a vertical standard open at its upper end;
   (b) an extension bar of square tubular construction and slidably fitted into said standard;
   (c) said extension bar having at its lower end, a narrow slot extending transversely across one side of the extension bar and a wide slot on the opposite side, the top edge of which wide slot lies beneath the level of the narrow slot;
   (d) a toggle bar in the form of a plate having one end fitted in the narrow slot and its other end projecting through the wide slot so that the toggle bar is mounted by the extension bar for pivotal movement about an axis transverse to the extension bar;
   (e) said toggle bar being dimensioned to engage inside one wall of the standard at a place located beneath the pivot axis and beneath the said top edge of said wide slot whereby a load on said extension bar causes the toggle bar to force the extension bar into wedging relationship with the opposite wall of the standard;
   (f) an operating rod extending downwardly from the top of said extension bar and through the toggle bar, said operating rod having an abutment above the toggle bar for moving the toggle bar away from said one inside wall to release the extension bar;
   (g) a coil spring surrounding the operating rod and located beneath the toggle bar for biasing the toggle bar to move upwardly about said pivot axis.

5. The combination as set forth in claim 4 in which said operating rod has a push button at its upper end that projects slightly above the upper end of said extension bar.

6. The combination as set forth in claim 5 together with means for preventing upward movement of said operating rod to maintain said push button in position, comprising a bracket at the lower end of said extension bar through which the lower end of said operating rod extends, and stop means mounted at the lower end of said operating rod.

* * * * *